US 6,871,896 B1
(12) United States Patent
Owen

(10) Patent No.: US 6,871,896 B1
(45) Date of Patent: Mar. 29, 2005

(54) TEMPORARY VEHICLE INTERIOR EXPANSION SYSTEM

(76) Inventor: James D. Owen, 23504 Deerfield Park Dr. # 4, Hill City, SD (US) 57745

(*) Notice: Subject to any disclaimer, the term of this patent is extended or adjusted under 35 U.S.C. 154(b) by 263 days.

(21) Appl. No.: 10/236,590

(22) Filed: Sep. 6, 2002

(51) Int. Cl.⁷ .................................................. B60P 3/34
(52) U.S. Cl. ..................... 296/26.11; 296/159; 296/161; 296/165; 135/88.05
(58) Field of Search .............................. 296/26.11, 159, 296/161, 162, 165; 135/88.05, 88.13, 88.14, 88.15, 88.16, 88.17

(56) References Cited

U.S. PATENT DOCUMENTS

| | | |
|---|---|---|
| 3,020,919 A | 2/1962 | Crump |
| 3,394,719 A | 7/1968 | Hansson |
| 3,863,977 A | 2/1975 | Hardinge |
| 3,968,809 A | 7/1976 | Beavers |
| 4,065,166 A * | 12/1977 | Shoemaker .................. 296/159 |
| 4,504,049 A | 3/1985 | Straub |
| 5,441,324 A * | 8/1995 | Gold ......................... 296/26.11 |
| 5,669,655 A | 9/1997 | Hammond |
| 5,820,189 A * | 10/1998 | Tew |
| 5,921,614 A | 7/1999 | Biedermann et al. |
| 6,113,171 A * | 9/2000 | Stearns ...................... 296/26.08 |
| 6,179,368 B1 | 1/2001 | Karlsson |

OTHER PUBLICATIONS

Popular Science, p. 172, May 1954, "A Carside Cabana",.*

* cited by examiner

Primary Examiner—Dennis H. Pedder
(74) Attorney, Agent, or Firm—Leonard & Proehl, Prof. LL.C.

(57) ABSTRACT

A temporary vehicle interior expansion system expands the usable interior size of a vehicle by utilizing the vehicle doors to form and support the system. The system includes an enclosure panel for draping over and between the doors of the vehicle to enclose an extended interior space in communication with an interior of the vehicle. The enclosure panel comprises a top portion, a pair of side portions, an end portion, and a bottom portion. A support assembly is also provided for supporting the top portion of the enclosure panel on the vehicle and holding the door in the open condition below the top portion of the enclosure panel, and may include a transverse support member for positioning transversely between the doors of the vehicle for holding the doors in the open condition. Optionally, a platform assembly may be removably mountable on the vehicle adjacent to the vehicle opening.

20 Claims, 8 Drawing Sheets

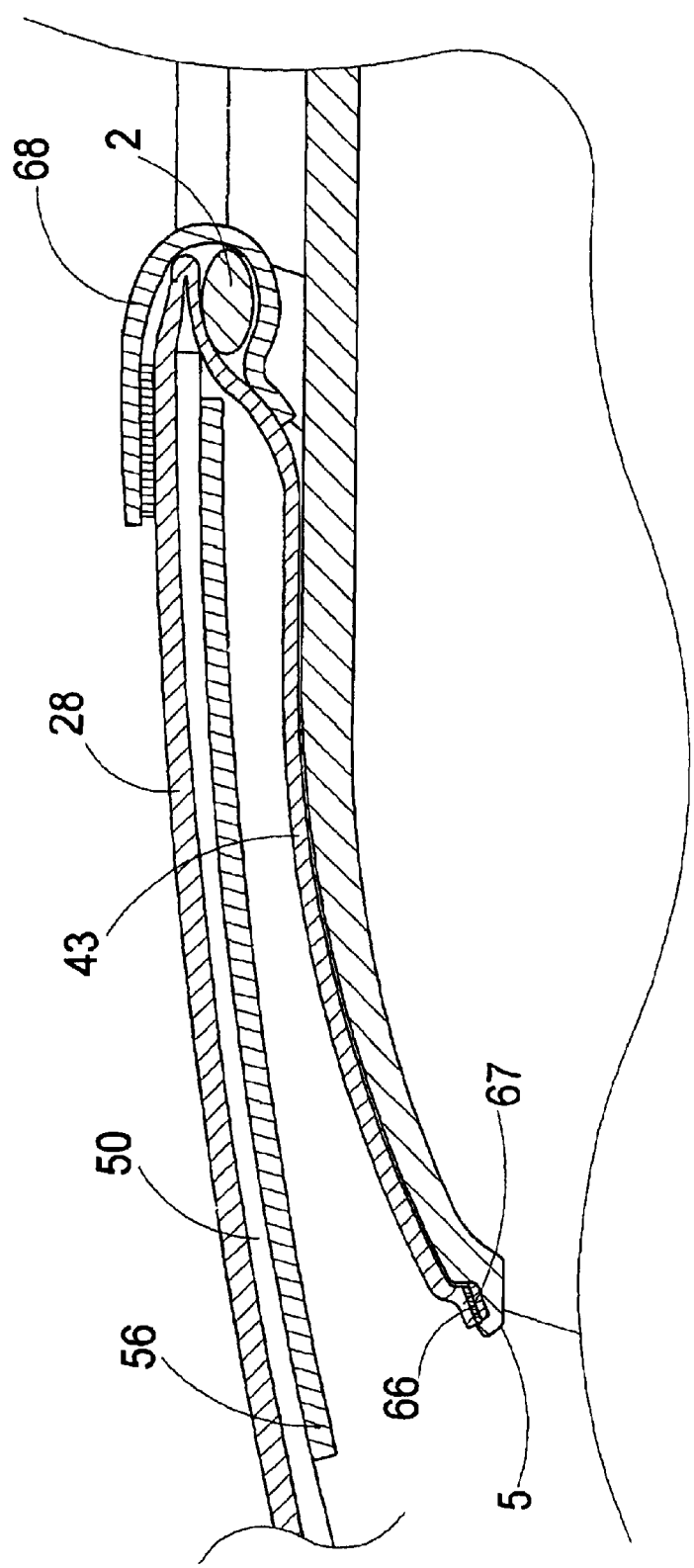

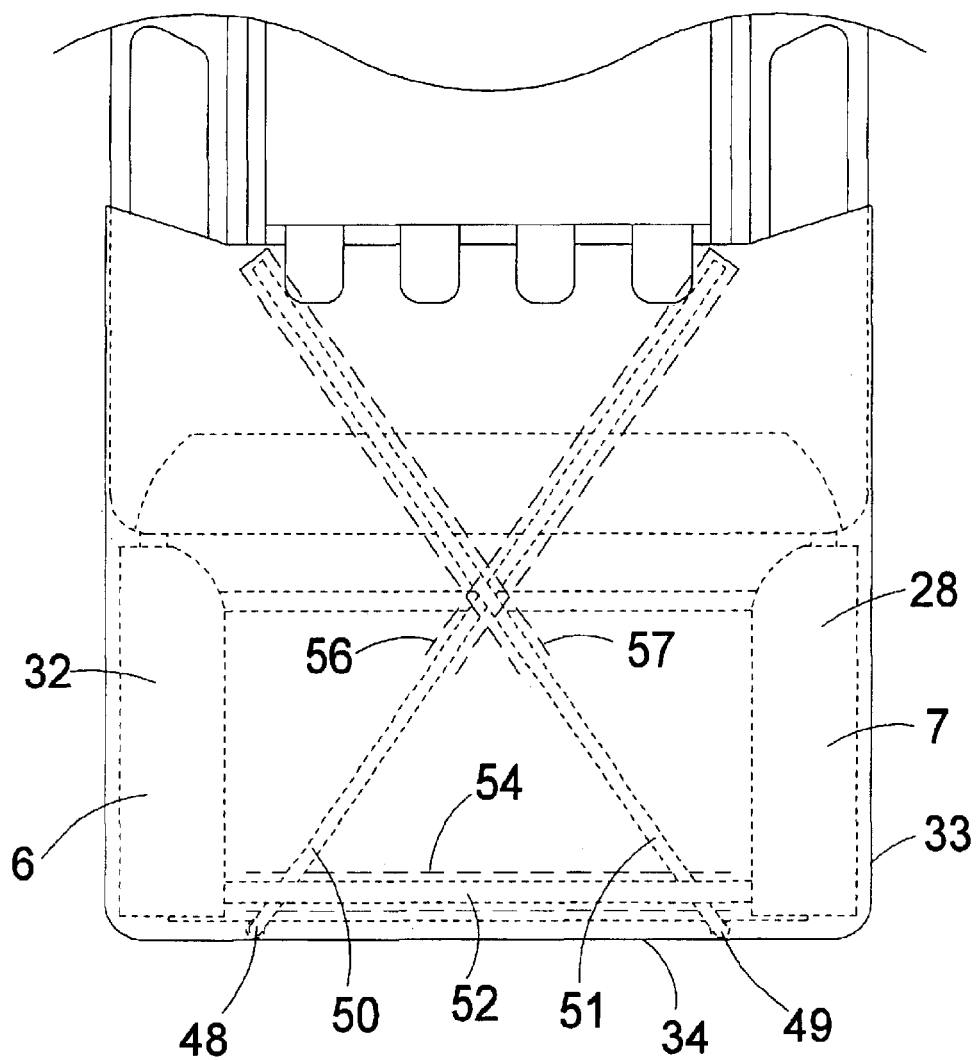

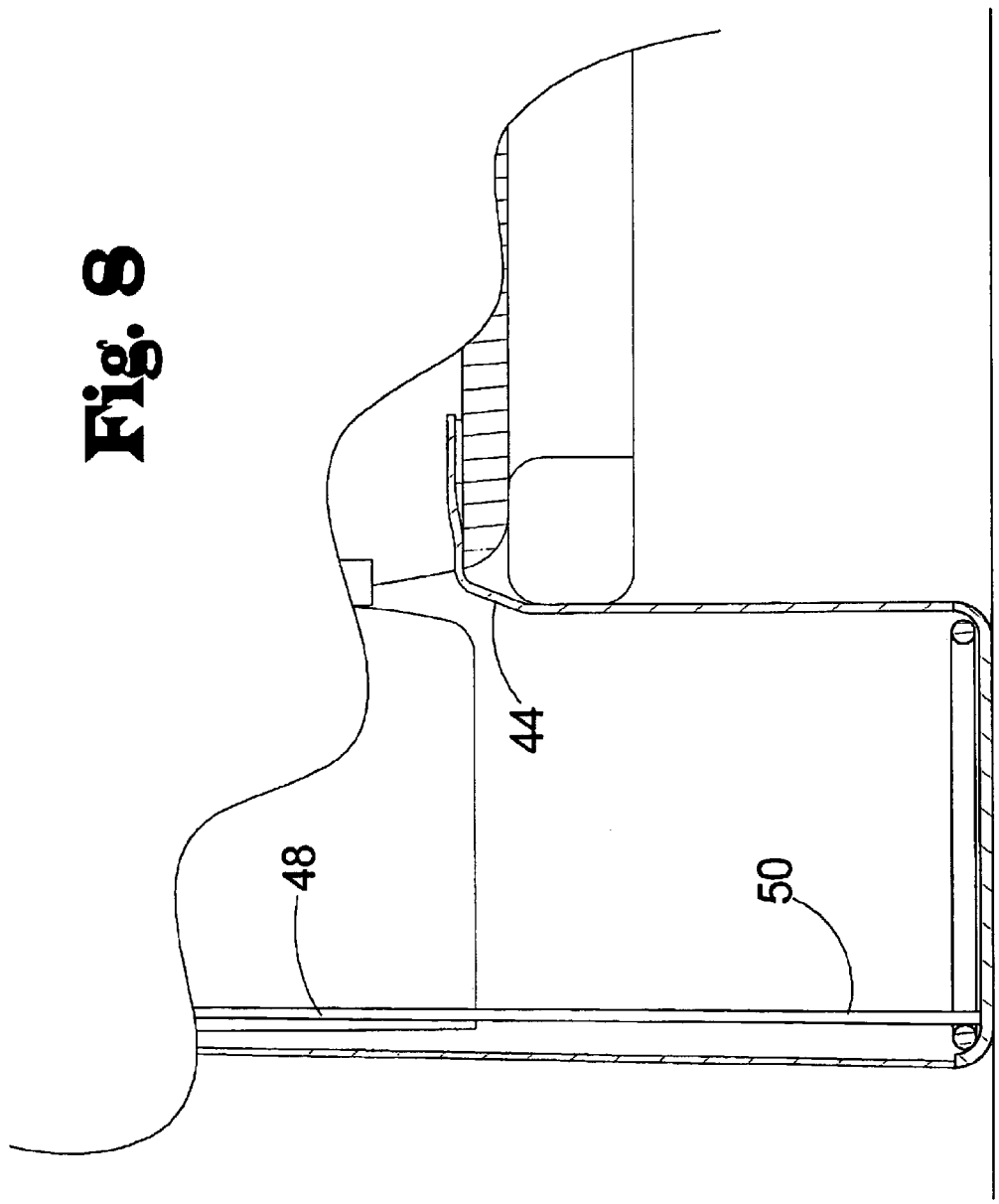

TEMPORARY VEHICLE INTERIOR EXPANSION SYSTEM

BACKGROUND OF THE INVENTION

1. Field of the Invention

The present invention relates to vehicle-mounted tent systems and more particularly pertains to a new temporary vehicle interior expansion system for expanding the usable interior size of a vehicle by utilizing the doors of the vehicle to form and support the interior expansion system.

2. Description of the Prior Art

The use of vehicle-mounted tent systems is known in the prior art. More specifically, the known vehicle-mounted tent systems heretofore devised employ a number of different types of support structures that derive different degrees of support from the associated vehicle, with some systems only being peripherally mounted to the vehicle (and thus requiring a significant degree of self support) and other systems being completely supported on the vehicle (and thus requiring no self support). Those systems that are completely, or substantially completely, supported on the vehicle are typically significantly limited in the headroom that is provided in the enclosed space. Those systems that have only a peripheral connection to the vehicle tend to have larger and more bulky support frames, which are more difficult to transport and to set up and take down.

In these respects, the temporary vehicle interior expansion system according to the present invention substantially departs from the conventional concepts and designs of the prior art.

SUMMARY OF THE INVENTION

In view of the foregoing disadvantages inherent in the known types of vehicle mounted tent systems now present in the prior art, the present invention provides a new temporary vehicle interior expansion system construction wherein the same can be utilized for expanding the usable interior size of a vehicle by utilizing the doors of the vehicle to form and support the interior expansion system.

To attain this, the present invention generally includes an enclosure panel for draping over and between the doors of the vehicle to enclose an extended interior space in communication with an interior of the vehicle. The enclosure panel comprises a top portion, a pair of side portions, an end portion, and a bottom portion. A support assembly is also provided for supporting the top portion of the enclosure panel on the vehicle and holding the door in the open condition below the top portion of the enclosure panel, and may include a transverse support member for positioning transversely between the doors of the vehicle for holding the doors in the open condition. Optionally, a platform assembly may be removably mountable on the vehicle adjacent to the vehicle opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Some significant advantages of the present invention include a system that may be completely supported on the vehicle (although auxiliary ground support may also be employed), that may incorporate a floor that is spaced from the ground surface while providing a greater amount of head room than the vehicle itself, and that provides a significant degree of privacy for the vehicle interior space and the extended interior space of the system.

Other advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 6 is a schematic enlarged view the portion of the present invention shown in FIG. 5 that is circled and labeled "6".

FIG. 7 is a schematic top view of a portion of the vehicle and the present invention.

FIG. 8 is a schematic sectional view of an optional configuration of the enclosure panel having a bottom portion adapted to rest on a ground surface when the panel is mounted on the vehicle.

DESCRIPTION OF PREFERRED EMBODIMENTS

Figure 1:
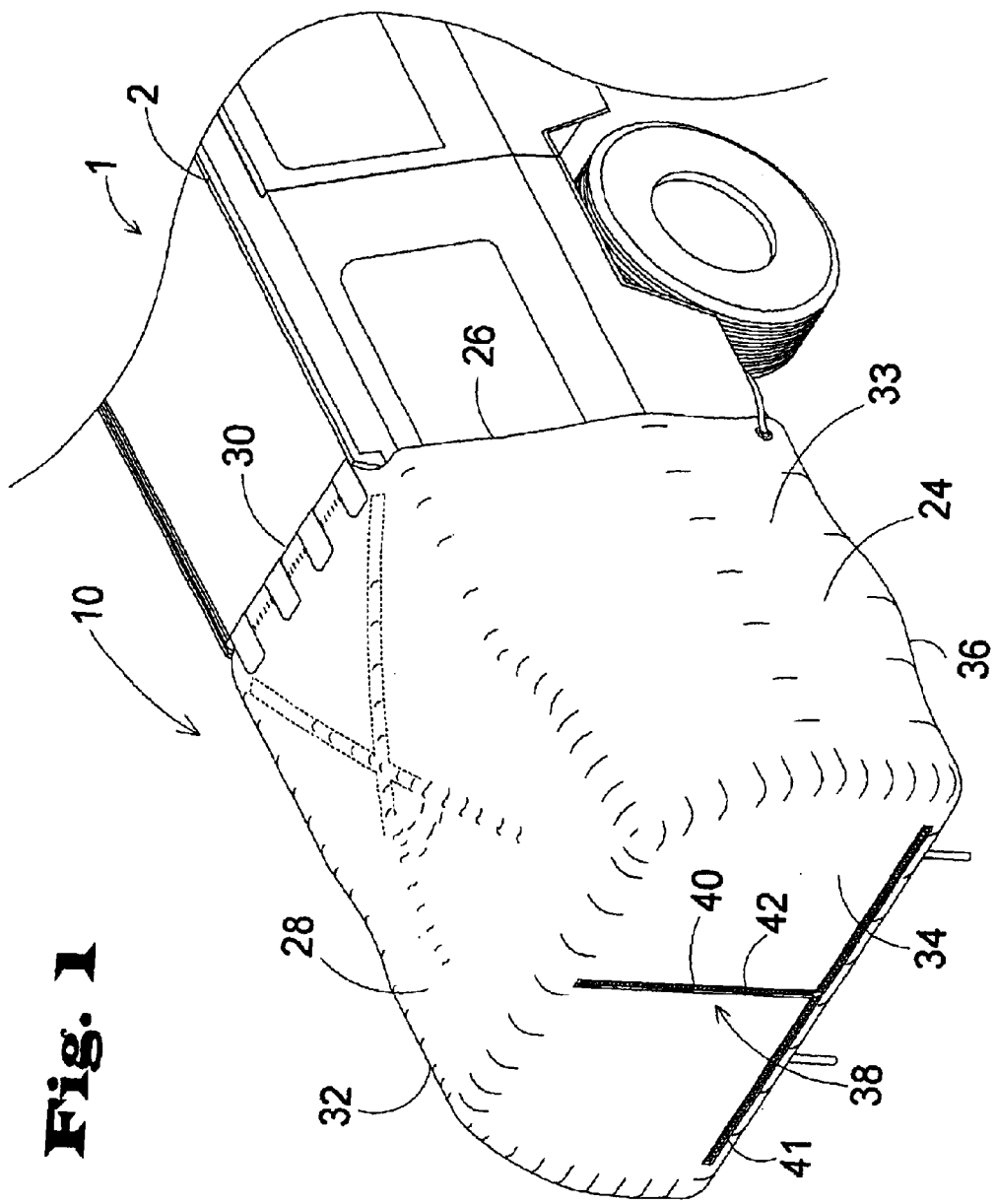
FIG. 1 is a schematic perspective view of a vehicle having the new temporary vehicle interior expansion system according to the present invention mounted on the vehicle shown from the rear passenger side corner of the vehicle.
Figure 2:
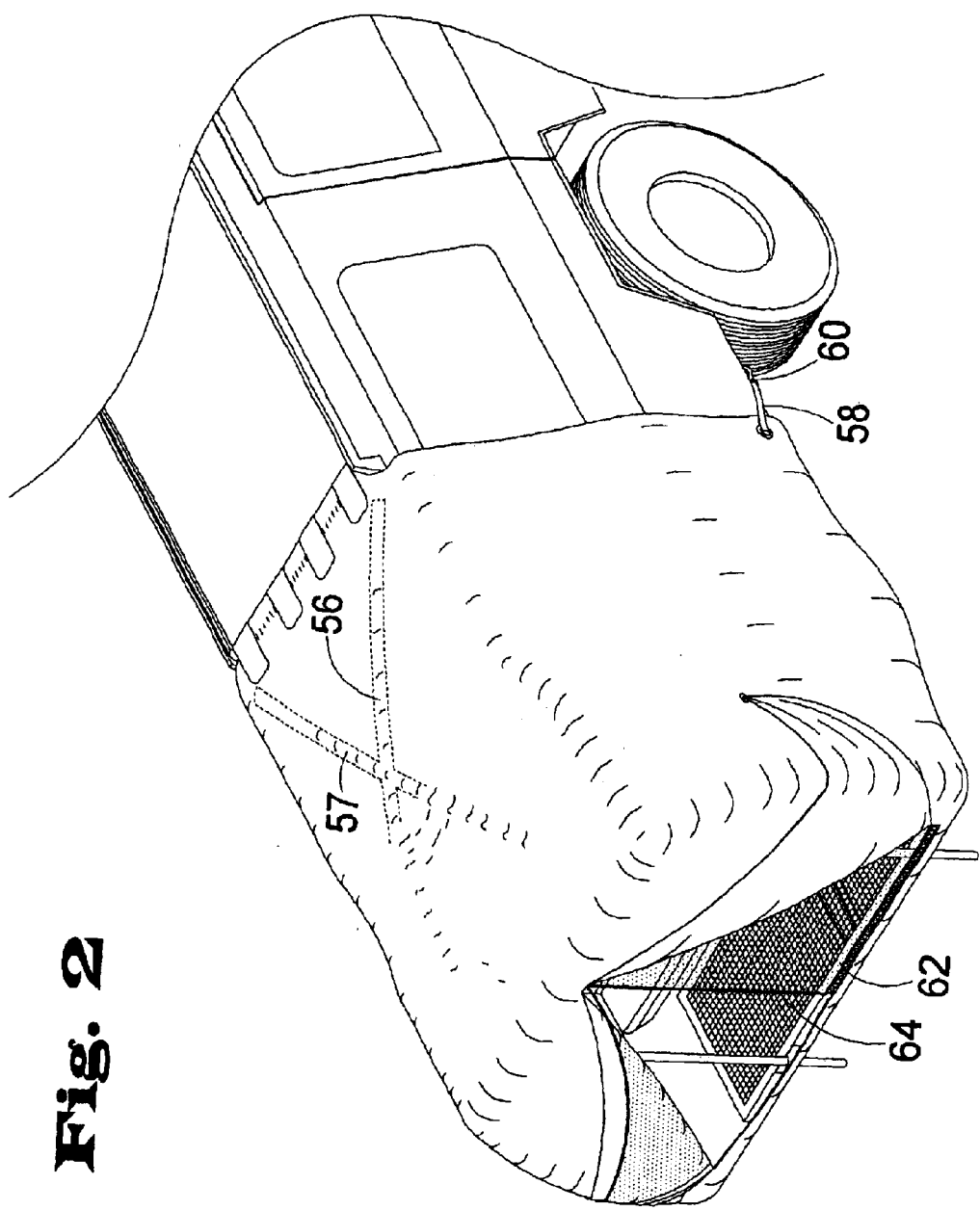
FIG. 2 is a schematic perspective view of the vehicle and the present invention that particularly shows the access opening in an open condition to reveal the screen panel extending across the access opening.
Figure 3:
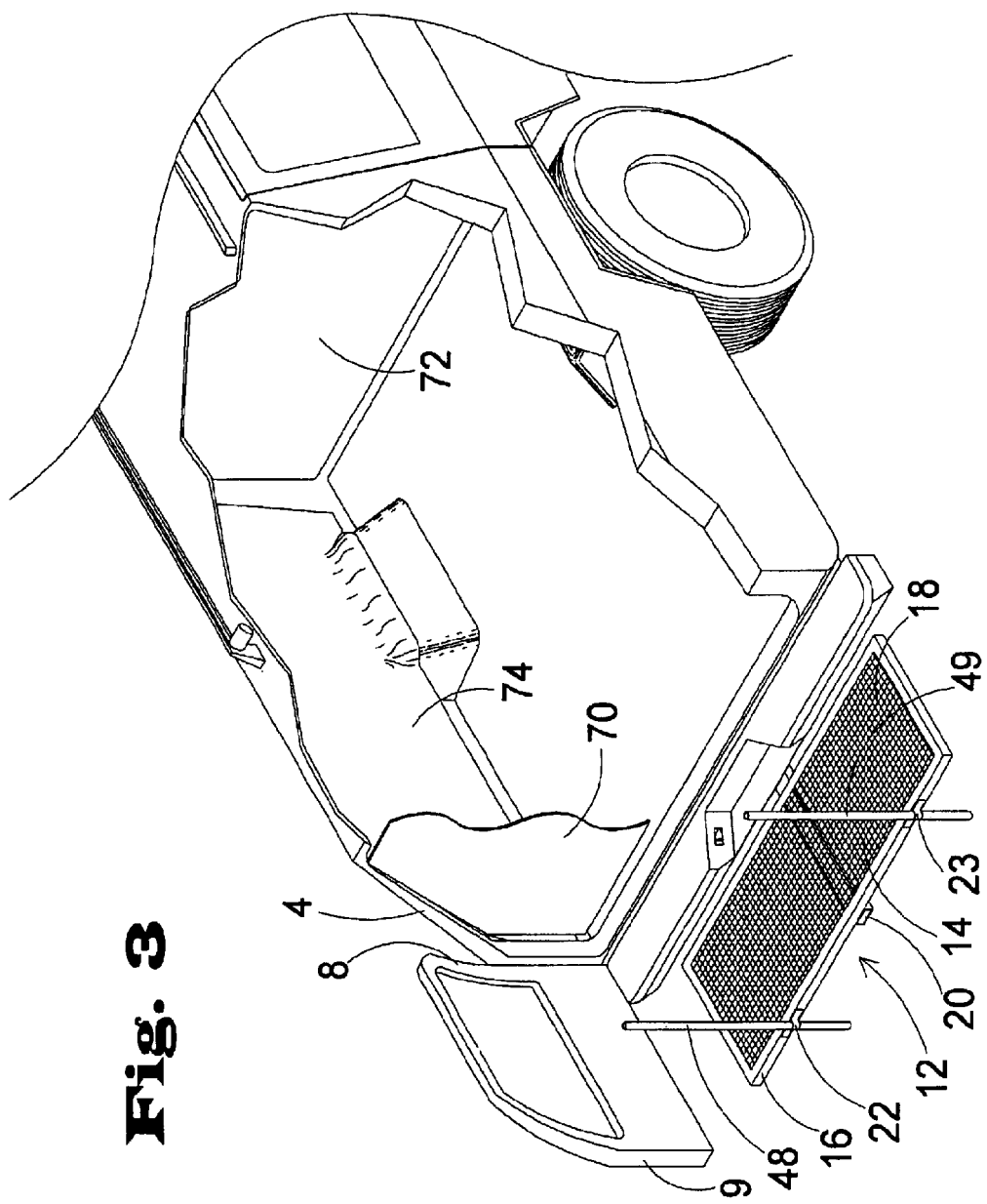
FIG. 3 is a schematic perspective view of the vehicle with a portion of the vehicle roof and side broken away to show aspects of the privacy panel assemblies in the interior of the vehicle as well as to show aspects of the platform assembly and the support assembly of the present invention.
Figure 4:
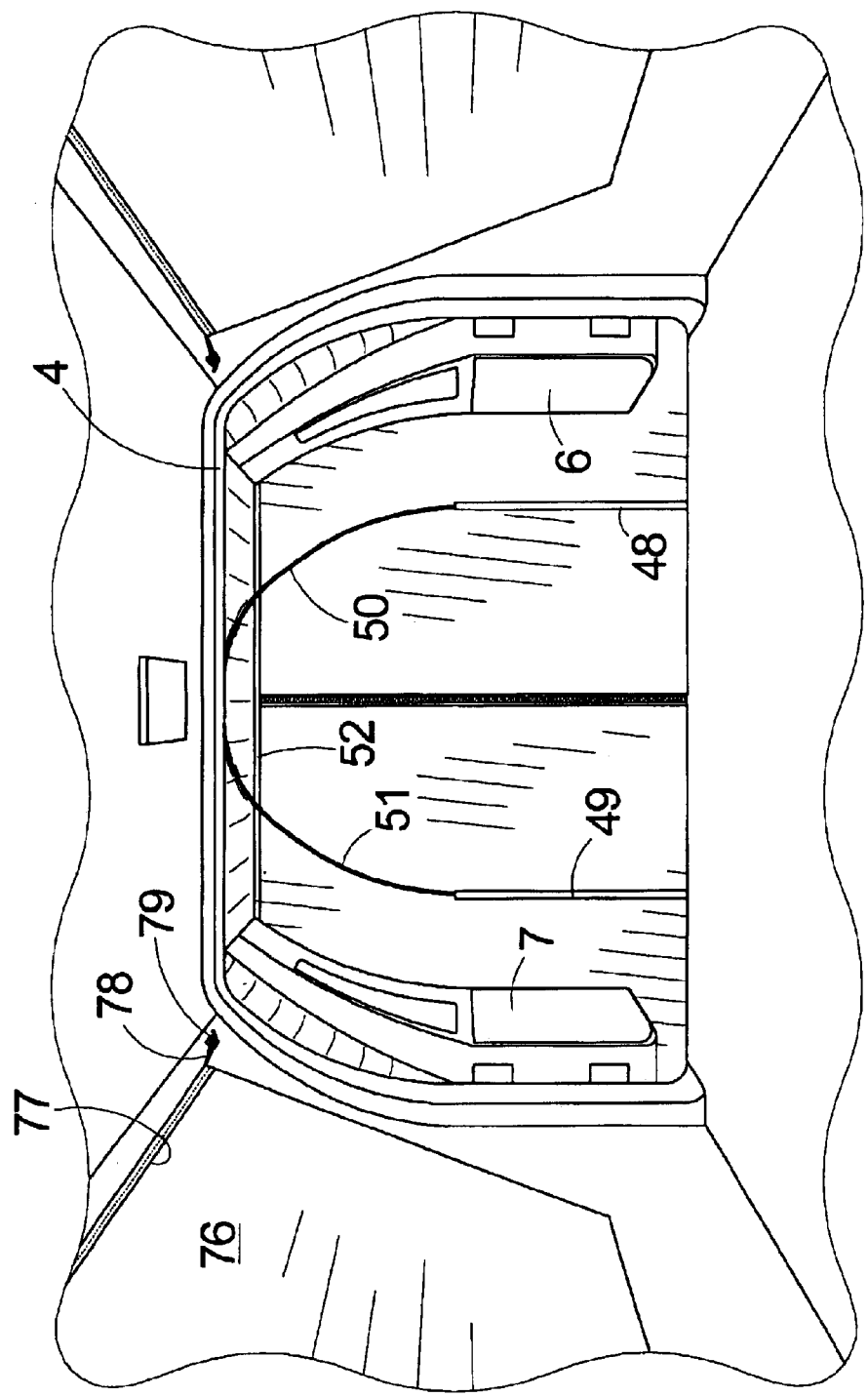
FIG. 4 is a schematic interior view of the present invention looking rearwardly into the extended interior space.
Figure 5:
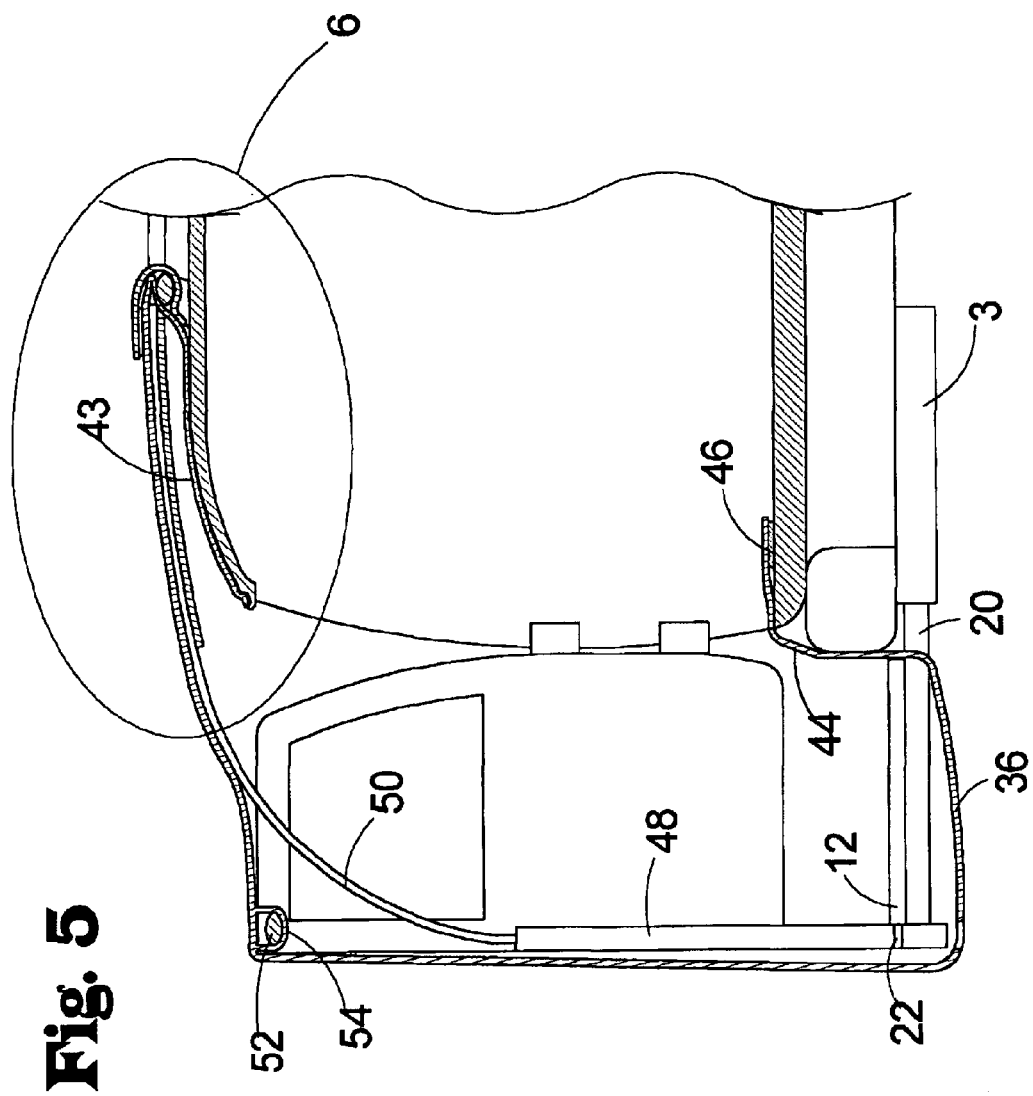
FIG. 5 is a schematic side sectional view of a rear portion of the vehicle with the invention mounted thereon.

With reference now to the drawings, and in particular to FIGS. 1 through 8 thereof, a new temporary vehicle interior expansion system embodying the principles and concepts of the present invention and generally designated by the reference numeral 10 will be described.

As best illustrated in FIGS. 1 through 8, the temporary vehicle interior expansion system 10 generally comprises a platform assembly 12 supportable on the vehicle, an enclosure panel 24 for enclosing the extension of the interior space, and a support assembly for supporting the enclosure panel on the vehicle.

The enclosure system 10 is removably mountable on a vehicle, and is most suitably mountable on a vehicle 1 of the type having an opening 4 and a pair of adjacent doors 6, 7 that are mounted on the vehicle adjacent to the opening for closing the opening. A few examples of vehicles having panel doors include sport utility vehicles (such as the Chevrolet Tahoe, Chevrolet Suburban, and GMC Yukon) and many conventional vans. Typically, these doors are located at the rear of the vehicle, but it will be realized that the invention might be applied to vehicles having a pair of opposed doors mounted on the side of the vehicle. The doors 6, 7 are typically pivotable about a substantially vertical axis between a closed condition in which the doors close the opening 4 and an open condition in which the doors extend substantially perpendicular to the general plane of the opening 4 (although the doors may swing wider than the perpendicular orientation). The doors each have a proximal end 8 that is pivotally coupled to the vehicle and a free distal end 9 that is swingable in an arc about the substantially vertical axis. The vehicle may have a perimeter jamb 5 that surrounds and defines the opening 4. The vehicle 1 may have a receiver hitch support 3 extending from below the opening 4. The vehicle also has a roof located above the opening 4, and may have a roof cargo rack 2 mounted on the roof.

The enclosure system 10 of the invention may comprise a platform assembly 12 that is removably mountable on the vehicle 1 adjacent to a lower portion of the perimeter jamb 5 defining the opening 4. The platform assembly 12 may be removably mountable on the receiver hitch support 3 of the vehicle such that the platform assembly may be positioned adjacent to the opening during periods of use of the system 10, and may be removed during periods of nonuse (or may be optionally left in place during movement of the vehicle to hold cargo such as bicycles). The platform may be positionable in a plane that is depressed or lowered from the lower portion of the perimeter jamb such that the platform forms a transitional surface or step between the ground surface below the vehicle and a floor of the rear portion of the interior of the vehicle. The platform assembly 12 may comprise a floor member 14 with a perimeter, and the floor member may include a perimeter wall 16 and a perforated panel 18 extending between the perimeter walls. The platform assembly 12 may also include a mounting member 20 mounted on the floor member 14 for removably inserting into the hitch receiver support 3. Significantly, the platform assembly 12 may comprise means for mounting upright supports (described in greater detail below) on the platform assembly. These means may include a first mounting socket 22 and a second mounting socket 23 mounted on the floor member. The mounting sockets 22, 23 may positioned as laterally spaced locations on the floor member 14, and may be mounted on a rearward location on the floor member. The mounting sockets 22, 23 may each have some structure that can be releasably tightened against the an upright support member (described below) when the upright-support member is inserted into the mounting socket, such as a bolt that bears against the upright support member or a camming lever that constricts the size of the mounting socket.

The enclosure system 10 may also comprise an enclosure panel 24 for draping over the doors 6, 7 of the vehicle 1 to enclose an extended interior space that is in communication with the interior of the vehicle. The enclosure panel has a perimeter edge 26 that extends about the periphery of the panel. The enclosure panel 24 may comprise a single panel of material, or a plurality of panels attached together in a suitable manner, such as by sewing or bonding. The enclosure panel may be considered to be formed by a plurality of portions which may or may not be individual pieces of material. For ease and clarity of description, the various portions of the enclosure panel are described in relation to a vehicle when the panel 24 is mounted on a vehicle.

The enclosure panel 24 may include a top portion 28 for extending outwardly from the vehicle from above the opening 4 in the vehicle. Significantly, the top portion 28 is adapted to rest on and extend between portions of the doors of the vehicle when the doors are in the open condition, so that the top portion bridges across the gap between the doors to generally form a roof for the extended interior space of the system 10. Generally, the top portion is positioned in a substantially horizontal orientation when the enclosure panel is mounted on the vehicle, and has a forward edge 30 for positioning above the roof of the vehicle.

The enclosure panel 24 may also include a pair of side portions 32, 33 that are each positioned along a lateral side of the top portion 28. When the enclosure panel 24 is mounted on the vehicle, each of the side portions 32, 33 extend outwardly from the opening 4 of the vehicle and are generally positioned adjacent to (and may rest against) an outer surface of one of the doors of the vehicle. The side portions are thus positioned on opposite sides of the opening 4 when the enclosure panel is mounted on a vehicle.

The enclosure panel 24 may further include an end portion 34 that extends between the side portions 32, 33 and extends from an end of the top portion 28. When the enclosure panel is mounted on a vehicle, the end portion 34 extends generally downwardly from the top portion 28 between the side portions.

The enclosure panel 24 may additionally include a bottom portion 36 that extends between the side portions 32, 33 and extends forward from the end portion 34 for positioning adjacent to a bottom of the opening 4 in the vehicle. A forward edge of the bottom portion 36 may have an elastic member mounted thereon for stretchably gathering the front edge of the bottom portion 36 about a lower side of the vehicle to help secure the enclosure panel to the vehicle.

An access opening 38 may be formed in the enclosure panel for permitting user ingress and egress from the extended interior. The access opening 38 may be positioned in the end portion 34 between the side portions and the doors of the vehicle. The access opening 38 may have an upper section 40 that extends between the top 28 and bottom 36 portions of the enclosure panel 24 and which is positionable in a substantially vertical orientation when the enclosure panel is mounted on the vehicle. The access opening 38 may also have a lower section 41 that extends between the side portions 32, 33. The lower section 41 may be in communication with the upper section 40 to form an inverted "T" configuration for the access opening. The lower section 41 may be positioned generally adjacent to the bottom portion 36. A closure means may be provided for selectively closing the access opening 38, preferably in a substantially continuous manner. In one embodiment of the invention, the closure means comprises a zipper The enclosure panel 24 may include a top flap portion 43 for minimizing the intrusion of the environment (such as wind or rain) and insects into the extended interior space of the system 10. The top flap portion 43 may be integral with or fixed to the top portion 28 of the enclosure panel 24 for extending rearwardly from the most forward extent or edge of the top portion toward the opening 4 of the vehicle (when the enclosure panel is mounted on the vehicle) so that the top portion overlaps or covers the top flap portion.

The enclosure panel 24 may also include a bottom flap portion 44 that extends forwardly from the bottom portion 36, and functions to extend into the opening 4 of the vehicle when the enclosure panel 24 is mounted on the vehicle. An attachment means or structure 46 may be provided on the bottom flap portion 44 for attaching the bottom flap portion to a carpet mounted on a floor of the vehicle inside the opening. In one preferred embodiment of the invention, the attachment structure 46 comprises a hook portion of a hook and loop fastener system that is well suited to removably hook onto the carpet of the vehicle.

The enclosure system 10 of the invention may also comprise a support assembly that is provided for supporting the enclosure panel 24 when the enclosure panel is mounted on the vehicle. The support assembly may include at least one upright support member 48, 49 that is removably mounted on the platform assembly 12. The upright support member 48, 49 may extend upwardly from the platform assembly when the member 48, 49 is mounted on the mounting socket 22, 23 of the platform assembly. The upright support member 48, 49 may not extend beyond the mounting socket, or may optionally extend through the mounting socket 22, 23 downwardly from the platform assembly 12 toward the ground and may contact and rest on the ground for providing enhanced support to the platform assembly. In one embodiment of the invention, two upright support members 48, 49 are included in the support assembly, and the pair of upright support members may be oriented substantially vertically in a spaced, substantially parallel relationship to each other.

The support assembly may also comprise a pair of cross support members 50, 51 for further supporting the top portion 28 of the enclosure panel 24. Each of the cross support members 50, 51 may have a first end that is (preferably removably) mounted on an upper end of one of the upright support members 48, 49, and a second end of each of the cross support members may be positioned above the roof of the vehicle for resting on the roof for support of the second end. The second end may extend to a position adjacent to the forward edge of the top portion. The cross support members may each extend forwardly and across the central longitudinal axis of the vehicle to the opposite lateral side of the vehicle such that the cross support members cross each other above the extended interior space of the system. Each of the cross support members may be resiliently flexible such that the cross support members may be flexed and arched between the upright support members and the location above the roof of the vehicle for placing the top portion of the enclosure panel under a degree of tension to keep the enclosure panel relatively tight and taut to minimize movement and flopping in the wind. Also, the cross support members 50, 51 may give the top portion 28 a domed shape that sheds water and thus aids drainage, and can extend and enhance the headroom beneath the top portion.

Another significant element of the support assembly comprises a transverse support member 52 for positioning transversely between the doors 6, 7 of the vehicle. The transverse support member 52 has two primary functions, including holding the doors in the open condition when the member 52 is lodged between the doors and supporting the end portion 34 of the enclosure panel. (The transverse support member 52 may also provide additional support to the top portion 28 of the enclosure panel, although the cross support members 50, 51 may provide primary support for the top portion.) The transverse support member 52 has opposite ends for each resting on a top edge of one of the doors such that the transverse support member forms a bridge between the doors for supporting the top portion of the enclosure panel. Ideally, the structure of the door forms a ledge or shoulder for receiving and vertically supporting an end of the transverse support member on the door.

The enclosure panel 24 may include various structures for holding various parts of the support assembly in position when the enclosure panel is mounted on a vehicle. The enclosure panel 24 may include a transverse support member sleeve 54 formed on the top portion of the enclosure panel that extends transversely across the top portion 28 between the side portions 32, 33. The transverse support member sleeve 54 has opposite openings, each being located adjacent to one of the side portions of the enclosure panel, to expose the ends of the transverse support member for resting on the doors.

The enclosure panel 24 may also include a pair of cross support member sleeves 56, 57 formed on the top portion 28 of the enclosure panel for receiving and positioning the cross support members 50, 51 with respect to the top portion. The cross support member sleeves 56, 57 may cross at a substantially central location on the top portion 24.

The enclosure panel 24 may also have a hooking means mounted on each of the side portions 32, 33 for hooking onto the vehicle adjacent to or on a wheel well structure on the vehicle, and it may be located toward a forward edge of each of the side portions 32, 33. Each of the hooking means may include an elastic member 58 that is mounted on a forward edge of each of the side portions, such as, for example, by passing the elastic member through a sleeve formed along the forward edge of the side portions for holding the forward edge of the side portions snugly against the sides of the body of the vehicle. The hooking means may also include a hook 60 mounted on an end of each of the elastic members for hooking on an edge of the body at the wheel well opening or a structure beside or inside the wheel well opening.

The enclosure system may also include a screen panel 62 mounted on the enclosure panel 24 adjacent to the end portion 34 for extending across the access opening 38 in the end portion and preventing bugs and other pests from entering the extended interior space while permitting the movement of air though the end portion of the enclosure panel when the access opening is in an open condition. The screen panel 62 may have a screen access opening 64 formed therein for permitting passage of a person through the screen panel. Screen closure means may be mounted on the screen panel 62 at the screen access opening 64 for selectively closing the screen access opening. The closure means preferably comprises a zipper assembly, but optionally could comprise other means such as hook and loop fastening structures.

The enclosure system 10 may further comprise a sealing assembly for substantially sealing a portion of the enclosure panel to the vehicle for blocking bug and moisture intrusion into the extended interior space of the system. The sealing assembly includes a first fastening strip 66 mountable on the vehicle and a second fastening strip 67 mounted on the enclosure panel, with the first and second fastening strips being removably fastenable together. The first fastening strip 66 may be adhered to the vehicle at a location adjacent to a top section of the perimeter jamb 5, and the second fastening strip 67 may be mounted on the top flap portion 43 of the enclosure panel 24. The top flap portion 43 is thus removably securable to the vehicle below the top portion 28 which extends over the top flap portion. The first fastening strip 66 is most preferably adhered to the vehicle in a groove formed in the body of the vehicle that surrounds the opening 4 such that the strip 66 may be left in place between uses of the system 10 but does not interfere with the closing of the doors 6, 7 and is not visible when the doors are closed. Preferably, the top flap portion 43 is secured or sealed in a substantially continuous manner to keep, for example, bugs from entering the extended interior space through any gaps between the enclosure panel and the roof of the vehicle. In one embodiment of the invention, a hook and loop fastening system (such as, for example, the system sold under the VELCRO trademark) is employed with one component of the hook and loop fastening system being mounted on the top section of the perimeter jamb and the other component of the fastener system being mounted on the top flap portion at a suitable location. Other suitable means of attachment may be used, but the hook and loop fastener system is preferable for providing a substantially continuous connection, being easy to adhere or otherwise mount on the vehicle without damaging the vehicle, and permitting easy release and reattachment of the top flap portion to the vehicle.

The enclosure system 10 may further include a securing assembly for removably securing the enclosure panel to the vehicle, and the securing assembly may be located on the top portion 28 to secure the enclosure panel 24 to the vehicle at a location above the opening. The securing assembly may include a plurality of securing straps 68, with each of the securing straps being mounted on the top portion of the enclosure panel. Each of the securing straps 68 forms an openable loop for securing about a transverse member of the roof rack of the vehicle to removably secure the top portion of the enclosure panel to the vehicle. The securing straps may be formed into loops using a hook and loop fastener system with one component being located on the securing strap and the other component being located on the outer surface of the top portion of enclosure panel. As the transverse member of the roof rack is located forwardly of the opening 4 in the vehicle, the top portion 28 is thus overlapped over the top flap portion 43 that is removably attached to the vehicle adjacent to the opening by the sealing assembly. The securing assembly thus secured the top portion and avoids a large degree of strain being imposed on the sealing assembly which is intended primarily to keep bugs and precipitation out of the extended interior space.

The enclosure system 10 of the invention may also include a plurality of privacy panel assemblies for positioning inside the vehicle to restrict viewing into the interior of the vehicle from outside of the vehicle. Each of the privacy panel assemblies may comprise a privacy panel 76 formed of an opaque or substantially opaque material. Each of the privacy panel assemblies may also comprise a sleeve 77 formed along an upper edge of the privacy panel that extends between the ends of the privacy panel, and a cord 78 (preferably having elastic characteristics) mounted in the sleeve on the privacy panel with ends for attaching to spaced locations on the interior of the vehicle. A loop 79 may be formed at each end of the cord for looping onto a hook formed on the interior surface of the vehicle, such as those provided by the vehicle manufacturer for the hanging of clothes hangers. Each of the privacy panel assemblies may also include lower attachment means mounted adjacent to a lower edge of the privacy panel for removably attaching a lower portion of the privacy panel to the interior of the vehicle. In one preferred embodiment of the invention, the lower attachment means includes a hook portion or strip of a hook and loop fastener system for removably hooking onto portions of the carpet in the vehicle.

The plurality of privacy panel assemblies may include one or more of the following panels, including a first privacy panel 70 for suspending adjacent to the opening in the vehicle to restrict vision through the opening, a second privacy panel 72 for suspending adjacent to a front seat of the vehicle to restrict vision into a rear portion of the interior of the vehicle, and a pair of side privacy panels 74 for suspending adjacent to a side window of the vehicle to restrict vision into the rear portion of the interior of the vehicle through the side windows.

In one optional embodiment of the invention, the bottom portion 36 of the enclosure panel 24 may be adapted to rest on the ground surface when the enclosure panel is mounted on the vehicle (see FIG. 8), and the platform assembly 12 may be omitted from such an embodiment. A frame may be positioned around the perimeter of the bottom panel 36 to shape the bottom portion as a floor for the interior space and also to provide of the enclosure Optionally, the bottom portion may comprise, or may be covered by, a moisture resistant panel to resist the movement of moisture on the ground surface from entering the extended interior space. The cross support members may be elongated to reach down to the ground surface, and the bottom flap portion may also be lengthened to extend from adjacent to the ground surface to the floor of the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An enclosure system removably mountable on a vehicle of the type having an opening and a pair of doors mounted on the vehicle adjacent to the opening for closing the opening, the doors being pivotable about a substantially vertical axis between a closed condition and an open condition, the enclosure system comprising:

an enclosure panel for draping over and between the doors of the vehicle to enclose an extended interior space in communication with an interior of the vehicle, the enclosure panel comprising:
a top portion for extending outwardly from the vehicle from above the opening in the vehicle when the enclosure panel is mounted on the vehicle, the top portion being restable on and extendable between tops of the doors of the vehicle when the doors arc in the open condition;
a pair of side portions each positioned along a lateral side of the top portion, the pair of side panels being extendable outwardly from the opening of the vehicle with each side portion being positioned adjacent to an outer surface of one of the doors of the vehicle when the enclosure panel is mounted on vehicle;

an end portion extending between the side portions and extending generally downwardly from the top portion when the enclosure panel is mounted on the vehicle;

a bottom portion extending between the side portions and extending forwardly from the end portion for positioning adjacent to a bottom of the opening in the vehicle when the enclosure panel is mounted on the vehicle;

a top flap portion fixed to the top portion of the enclosure panel for extending rearwardly toward the opening when the enclosure panel is mounted on the vehicle, the top flat, portion being removably mountable to the vehicle at a top section of a perimeter jamb defining the opening of the vehicle; and a support means for supporting the top portion of the enclosure panel on the vehicle and holding the doors in the open condition below the top portion of the enclosure panel.

2. The system of claim 1 wherein the support means includes a transverse support member for positioning transversely between the doors of the vehicle for holding the doors in the open condition.

3. The system of claim 2 wherein the transverse support member has opposite ends for each resting on a top edge of one of the doors such that the transverse support member forms a bridge between the doors for supporting the end portion of the enclosure panel.

4. The system of claim 1 additionally comprising a platform assembly removably mountable on the vehicle adjacent to a lower portion of the opening, and wherein the support means includes at least one upright support member removably mounted on the platform assembly, the upright support member being extendable upwardly from the platform assembly.

5. The system of claim 4 wherein the platform assembly includes at least one mounting socket, the at least one upright support member being mounted on the at least one mounting socket.

6. The system of claim 4 wherein two of the upright support members are removably mounted on the platform in a substantially vertical orientation and in a spaced relationship to each other.

7. The system of claim 4 wherein the support assembly includes at least one cross support member for supporting the top portion of the enclosure panel, the at least one cross support member having a first end removably mountable to an upper end of one of the upright support members, the at least one cross member being resiliently flexible, a first end of the at least one cross support member being mounted on one of the upright members and a second end of the at least one cross support members extending forward and being positioned adjacent to a forward edge of the top portion.

8. The system of claim 1 additionally comprising a scaling assembly for sealing a portion of the enclosure panel to the vehicle, the scaling assembly including a first fastening strip mountable on the vehicle and a second fastening strip mounted on the enclosure panel, the first and second fastening strips being removably fastenable together, the first fastening strip being adherable to the vehicle at a location adjacent to a top section of the perimeter jamb, the second fastening strip being mounted on the top flap portion of the enclosure panel.

9. The system of claim 1 wherein the enclosure panel includes a bottom flap portion extending forwardly from the bottom portion for extending into the opening on the vehicle when the enclosure panel is mounted on the vehicle.

10. The system of claim 9 additionally comprising attachment means being mounted on a forward edge of the bottom flap portion for attaching to a carpet on a floor of the vehicle inside the opening when the enclosure panel is mounted on the vehicle.

11. The system of claim 1 additionally comprising a plurality of privacy panel assemblies for positioning inside the vehicle.

12. The system of claim 11 wherein the plurality of privacy panel assemblies includes:

a first privacy panel for suspending adjacent to the opening in the vehicle to restrict vision through the opening;

a second privacy panel for suspending adjacent to a front seat of the vehicle to restrict vision into a rear portion of the interior of the vehicle; and a pair of side privacy panels for suspending adjacent to a side window of the vehicle to restrict vision into the rear portion of the interior of the vehicle through the side windows.

13. The system of claim 1 wherein the bottom portion of the enclosure panel is adapted to rest on the ground surface when the enclosure panel is mounted on the vehicle.

14. The system of claim 1 wherein an access opening is formed in the end portion of the enclosure panel, the access opening having an upper section extending between the top and bottom portions for being positioned in a substantially vertical orientation when the enclosure panel is mounted on the vehicle, the access opening also having a lower section extending between the side portions and being in communication with the upper section, the lower section being positioned adjacent to the bottom portion.

15. The system of claim 14 additionally comprising a screen panel mounted on the enclosure panel adjacent to the end portion thereof for extending across the access opening in the end portion, the screen panel having a screen access opening formed there for permitting passage through the screen panel.

16. The system of claim 1 additionally comprising a platform assembly removably mountable on the vehicle adjacent to a lower portion of the opening, the platform assembly being removably mountable on a receiver hitch support of the vehicle to support the platform assembly in a spaced relationship with respect to a ground surface below the vehicle.

17. The system of claim 1 additionally comprising a platform assembly removably mountable on the vehicle adjacent to a lower portion of the opening, and wherein the platform assembly comprises:

a floor member with a perimeter, the floor member including a perimeter wall and a perforated panel extending between the perimeter wall;

a mounting member for removably inserting into the hitch receiver support, the mounting member being mounted on the floor member;

a first mounting socket mounted on the floor member; and a second mounting socket mounted on the floor member.

18. The system of claim 1 wherein the support means includes a transverse support member for positioning transversely between the doors of the vehicle for holding the doors in the open condition;

wherein the transverse support member has opposite ends for each resting on a top edge of one of the doors such that the transverse support member forms a bridge between the doors for supporting the top portion of the enclosure panel;

wherein the support means includes at least one upright support member removably mounted on a platform assembly, the upright support member being extendable upwardly from the platform assembly;

wherein the platform assembly includes at least one mounting socket, the at least one upright support member being mounted on the at least one mounting socket;

wherein the at least one upright support member comprises two upright support members removably mounted on the platform in a substantially vertical orientation in a spaced relationship to each other;

wherein the support assembly includes at least one cross support member for supporting the top portion of the enclosure panel, the at least one cross support member having a first end removably mountable to an upper end of one of the upright support members, the at least one cross member being resiliently flexible, a first end of the at least one cross support member being mounted on one of the upright members and a second end of the at least one cross support members extending forward and being positioned adjacent to a forward edge of the top portion;

a sealing assembly for sealing a portion of the enclosure panel to the vehicle, the sealing assembly including a first fastening strip mountable on the vehicle and a second fastening strip mounted on the enclosure panel, the first and second fastening strips being removably fastenable together, the first fastening strip being adherable to the vehicle at a location adjacent to a top section of the perimeter jamb, the second fastening strip being mounted on the top flap portion of the enclosure panel;

wherein the enclosure panel includes a bottom flap portion extending forwardly from the bottom portion for extending into the opening on the vehicle when the enclosure panel is mounted on the vehicle;

attachment means being mounted on a forward edge of the bottom flap portion for attaching to a carpet on a floor of the vehicle inside the opening when the enclosure panel is mounted on the vehicle;

a securing assembly for removably securing the enclosure panel to the vehicle, the securing assembly removably securing the top portion of the enclosure panel to the vehicle at a location above the opening, the securing assembly including a plurality of securing straps, each of the securing straps being mounted on the top portion of the enclosure panel and forming an openable loop for securing about a transverse member of a roof rack of the vehicle to removably secure the top portion of the enclosure panel to the vehicle;

a plurality of privacy panel assemblies for positioning inside the vehicle, wherein each of the privacy panel assemblies includes:
   a privacy panel formed of an opaque material;
   a sleeve formed along an upper edge of the privacy panel and extending between ends of the privacy panel;
   a cord mounted in the sleeve on the privacy panel with ends for attaching to spaced locations on the interior of the vehicle, a loop being formed at each end of the cord for looping onto a hook formed on the interior surface of the vehicle; and
   lower attachment means mounted adjacent to a lower edge of the privacy panel for removably attaching a lower edge of the privacy panel to the interior of the vehicle, wherein the plurality of privacy panel assemblies includes:
      a first privacy panel for suspending adjacent to the opening in the vehicle to restrict vision through the opening;
      a second privacy panel for suspending adjacent to a rear seat of the vehicle to restrict vision into a rear portion of the interior of the vehicle; and
      a pair of side privacy panels for suspending adjacent to a side window of the vehicle to restrict vision into the rear portion of the interior of the vehicle through the side windows;

wherein an access opening is formed in the end portion of the enclosure panel, the access opening having an upper section extending between the top and bottom portions for being positioned in a substantially vertical orientation when the enclosure panel is mounted on the vehicle, the access opening also having a lower section extending between the side portions and being in communication with the upper section, the lower section being positioned adjacent to the bottom portion;

a screen panel mounted on the enclosure panel adjacent to the end portion thereof for extending across the access opening in the end portion, the screen panel having a screen access opening formed there for permitting passage through the screen panel;

wherein the platform assembly is adapted to be removably mountable on a receiver hitch support of the vehicle and supports the platform assembly in a spaced relationship with respect to a ground surface below the vehicle; and wherein the platform assembly comprises:
   a floor member with a perimeter, the floor member including a perimeter wall and a perforated panel extending between the perimeter wall;
   a mounting member for removably inserting into the hitch receiver support, the mounting member being mounted on the floor member;
   a first mounting socket mounted on the floor member; and
   a second mounting socket mounted on the floor member.

19. An enclosure system removably mountable on a vehicle of the type having an opening and a pair of doors mounted on the vehicle adjacent to the opening for closing the opening, the doors being pivotable about a substantially vertical axis between a closed condition and an open condition, the enclosure system comprising:

an enclosure panel for draping over and between the doors of the vehicle to enclose an extended interior space in communication with an interior of the vehicle, the enclosure panel comprising:
   a top portion for extending outwardly from the vehicle from above the opening in the vehicle when the enclosure panel is mounted on the vehicle, the top portion being restable on and extendable between tops of the doors of the vehicle when the doors are in the open condition;
   a pair of side portions each positioned along a lateral side of the top portion, the pair of side panels being extendable outwardly from the opening of the vehicle with each side portion being positioned adjacent to an outer surface of one of the doors of the vehicle when the enclosure panel is mounted on vehicle;

an end portion extending between the side portions and extending generally downwardly from the top portion when the enclosure panel is mounted on the vehicle;

a bottom portion extending between the side portions and extending forwardly from the end portion for positioning adjacent to a bottom of the opening in the vehicle when the enclosure panel is mounted on the vehicle;

a support means for supporting the top portion of the enclosure panel on the vehicle and holding the doors in the open condition below the top portion of the enclosure panel; and a platform assembly removably mountable on the vehicle adjacent to a lower portion of the opening, and wherein the support means includes at least one upright support member removably mounted on the platform assembly, the upright support member being extendable upwardly from the platform assembly.

20. An enclosure system removably mountable on a vehicle of the type having an opening and a pair of doors mounted on the vehicle adjacent to the opening for closing the opening, the doors being pivotable about a substantially vertical axis between a closed condition and an open condition, the enclosure system comprising:

an enclosure panel for draping over and between the doors of the vehicle to enclose an extended interior space in communication with an interior of the vehicle, the enclosure panel comprising:

a top portion for extending outwardly from the vehicle from above the opening in the vehicle when the enclosure panel is mounted on the vehicle, the top portion being restable on and extendable between tops of the doors of the vehicle when the doors are in the open condition;

a pair of side portions each positioned along a lateral side of the top portion, the pair of side panels being extendable outwardly from the opening of the vehicle with each side portion being positioned adjacent to an outer surface of one of the doors of the vehicle when the enclosure panel is mounted on vehicle;

an end portion extending between the side portions and extending generally downwardly from the top portion when the enclosure panel is mounted on the vehicle;

a bottom portion extending between the side portions and extending forwardly from the end portion for positioning adjacent to a bottom of the opening in the vehicle when the enclosure panel is mounted on the vehicle;

a support means for supporting the top portion of the enclosure panel on the vehicle and holding the doors in the open condition below the top portion of the enclosure panel; and a securing assembly for removably securing the enclosure panel to the vehicle, the securing assembly removably securing the top portion of the enclosure panel to the vehicle at a location above the opening, the securing assembly including a plurality of securing straps, each of the securing straps being mounted on the top portion of the enclosure panel and forming an openable loop for securing about a transverse member of a roof rack of the vehicle to removably secure the top portion of the enclosure panel to the vehicle.

* * * * *